(12) United States Patent
Uematsu (10) Patent No.: US 6,838,784 B2
(45) Date of Patent: Jan. 4, 2005

(54) CONTROL CIRCUIT FOR SWITCHING POWER SUPPLY DEVICE AND SWITCHING POWER SUPPLY DEVICE USED THEREWITH

(75) Inventor: Takeshi Uematsu, Chuo-ku (JP)

(73) Assignee: TDK Corporation, Chuo-ku (JP)

( * ) Notice: Subject to any disclaimer, the term of this patent is extended or adjusted under 35 U.S.C. 154(b) by 23 days.

(21) Appl. No.: 10/397,650

(22) Filed: Mar. 25, 2003

(65) Prior Publication Data

US 2003/0185030 A1 Oct. 2, 2003

(30) Foreign Application Priority Data

Mar. 28, 2002 (JP) ........................................ 2002-090247

(51) Int. Cl.$^7$ ................................................ H02J 1/00
(52) U.S. Cl. ......................................................... 307/38
(58) Field of Search ................................ 307/11, 29, 38

(56) References Cited

U.S. PATENT DOCUMENTS 4,129,788 A * 12/1978 Chavannes .................... 307/11
5,128,595 A * 7/1992 Hara ............................. 315/312
5,481,140 A * 1/1996 Maruyama et al. ............ 307/11

* cited by examiner

Primary Examiner—Adolf Berhane
(74) Attorney, Agent, or Firm—Seed IP Law Group PLLC (57) ABSTRACT

The present invention relates to a control circuit for a switching power supply device that is adapted to drive two or more loads and can quickly eliminate a voltage difference occurring between the two or more loads. The control circuit for a switching power supply device has an output terminal that is to be connected to a power supply terminal of a first load by a first wiring and a power supply terminal of a second load by a second wiring. The control circuit comprises a first control loop for stabilizing an output voltage appearing at the output terminal and a second control loop for eliminating a difference between a first voltage appearing at the first wiring in a vicinity of the power supply terminal of the first load and a second voltage appearing at the second wiring in a vicinity of the power supply terminal of the second load.

16 Claims, 5 Drawing Sheets

CONTROL CIRCUIT FOR SWITCHING POWER SUPPLY DEVICE AND SWITCHING POWER SUPPLY DEVICE USED THEREWITH

BACKGROUND OF THE INVENTION

The present invention relates to a control circuit for a switching power supply device and a switching power supply device used therewith, and in particular, a control circuit for a switching power supply device which is adapted to drive two or more loads and a switching power supply device used therewith.

DESCRIPTION OF THE PRIOR ART

Conventionally, switching power supply devices are used in various products, such as computers, home electronic devices, cars and the like. Typical switching power supply devices include a DC/DC converter that once converts a direct current input voltage into an alternating current using a switching circuit and then converts the alternating current back into a direct current using an output circuit, thereby generating a direct-current output voltage whose level is different from that of the input voltage.

In such a switching power supply device, the output voltage is detected by a control circuit and switching operation is controlled by a switching circuit based on the thus detected output voltage. As a result, a stable operating voltage can be supplied to a load to be driven by the switching power supply device.

However, in the case where the distance from the output terminal of the switching power supply device to the power supply terminal of the load is long, the voltage that actually appears at the power supply terminal of the load may deviate from the target value due to the influence of a parasitic component and the like present between the output terminal of the switching power supply device and the power supply terminal of the load.

For solving this problem, a switching power supply device using a so-called remote-sensing system has been proposed and put to practical use in recent years. In the remote-sensing system, an output capacitor is disposed in the vicinity of the power supply terminal of the load and the output voltage in the vicinity of the power supply terminal is detected by the switching power supply device.

Use of such a system makes it possible to minimize the influence of the parasitic component and the like present between the output terminal of the switching power supply device and the power supply terminal of the load when the distance from the output terminal of the switching power supply device to the power supply terminal of the load is long.

However, in the case of driving two or more loads using a single switching power supply device, if the load current (output current of the switching power supply device) flowing through one load increases abruptly, the output capacitor associated with the load discharges rapidly, causing the voltage at the power supply terminal of the load to drop and thereby generate a voltage difference between itself and the power supply terminal(s) of the other load(s).

In the switching power supply device using the remote-sensing system, the output capacitor usually provided at the output terminal of the switching power supply device is omitted or made very small. When such a voltage difference occurs, therefore, electric charge transfers occur among the output capacitors associated with the respective loads. As a result, the voltage at the power supply terminals of the individual loads fluctuate greatly.

In particular, since a CPU (central processing unit) or a DSP (digital signal processor) is a device which performs very high-speed operation and consumes a large amount of current in the active state but consumes only a very small amount of current in the non-active state, the fluctuation of the load current is very rapid. Accordingly, if CPUs or DSPs are installed in the plurality of loads to be driven by only a single switching power supply device, the above-mentioned problem becomes very serious.

Figure 5:
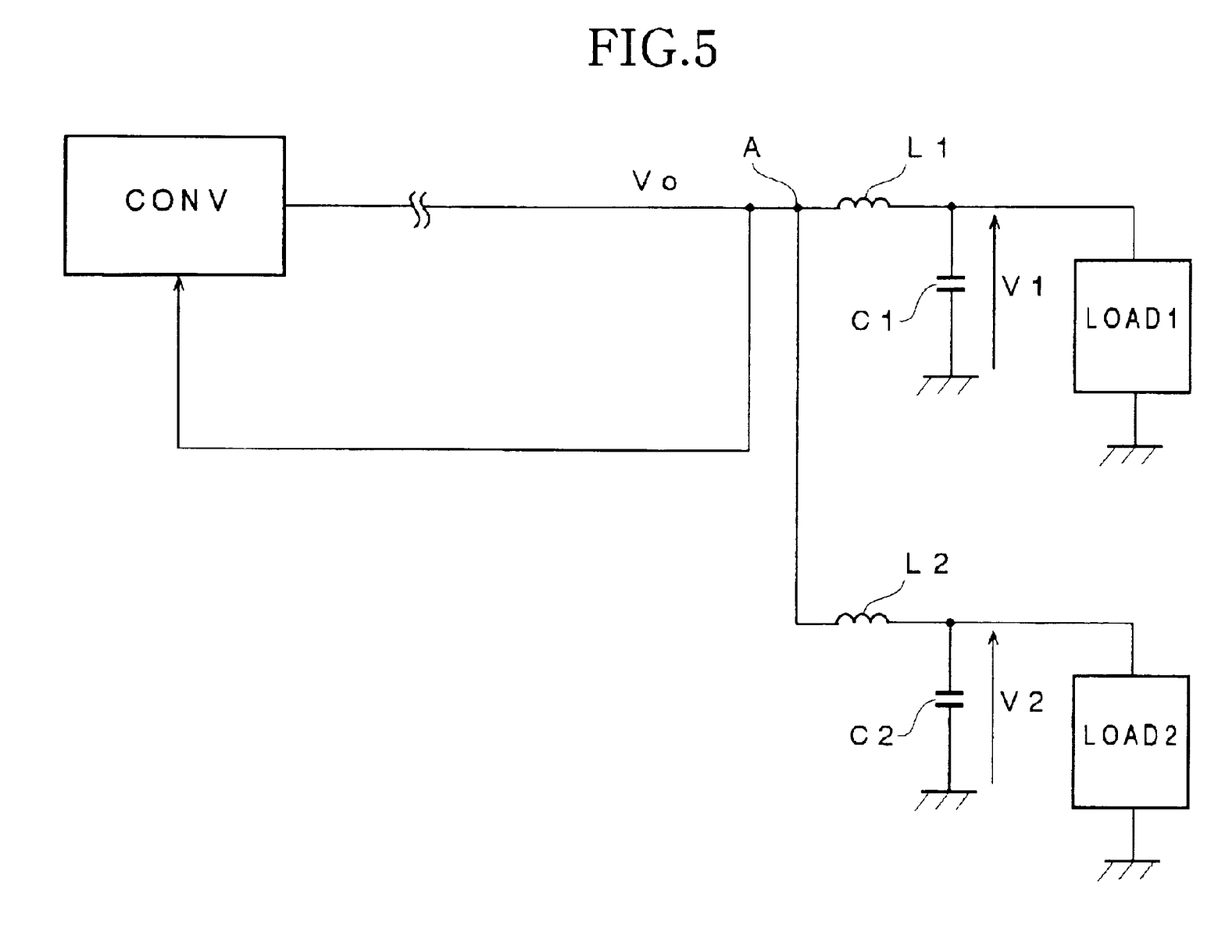
FIG. 5 is a circuit diagram schematically showing a circuit for driving two loads using a single switching power supply device.

Specifically, as shown in FIG. 5, in the case where two loads LOAD1 and LOAD2 are driven using a switching power supply device, wherein V1 is the voltage of an output capacitor C1 associated with the load LOAD1, V2 is the voltage of an output capacitor C2 associated with the load LOAD2, L1 is a parasitic inductance component present between the branch point A and the output capacitor C1, and L2 is a parasitic inductance component present between the branch point A and the output capacitor C2, if the voltage V1 drops owing to rapid increase of the load current flowing through the load LOAD1 and a voltage difference ΔV (=V1−V2) occurs between the voltage V1 and the voltage V2, a current ΔI given by the following formula (1) flows from the output capacitor C2 to the output capacitor C1.

$$\Delta I = \Delta V \cdot t / (L1 + L2) \tag{1}$$

In the formula (1), t is the time duration of the voltage difference ΔV between voltage V1 and the voltage V2.

Since the parasitic inductance elements L1 and L2 are generally very small, such as on the order of several tens of nH, the amount of the current ΔI flowing from the output capacitor C2 to the output capacitor C1 becomes considerably large and, as a result, the voltage V2 of the output capacitor C2 inevitably drops.

Accordingly, in the conventional switching power supply device, when the load current flowing through one of the loads connected to each other increases abruptly and the voltage of the output capacitor associated therewith drops, the voltage of the output capacitors associated with other loads also drop markedly.

Although it might be thought that this problem can be overcome by increasing the response speed of the switching power supply device, this requires the output capacitor to be connected to the output terminal of the switching power supply device to be omitted or be made very small in capacity. However, if the output capacitor to be connected to the output terminal of the switching power supply device is omitted or made very small, the current flowing through the output capacitors associated with the respective loads increases markedly.

SUMMARY OF THE INVENTION

It is therefore an object of the present invention to provide a control circuit for a switching power supply device that is adapted to drive two or more loads and can quickly eliminate a voltage difference occurring between the two or more loads.

Another object of the present invention is to provide a switching power supply device that is adapted to drive two or more loads and can quickly eliminate a voltage difference occurring between the two or more loads.

The above and other objects of the present invention can be accomplished by a control circuit for a switching power supply device having an output terminal that is to be connected to a power supply terminal of a first load by a first wiring and a power supply terminal of a second load by a second wiring, comprising a first control loop for stabilizing an output voltage appearing at the output terminal and a second control loop for eliminating a difference between a first voltage appearing at the first wiring in a vicinity of the power supply terminal of the first load and a second voltage appearing at the second wiring in a vicinity of the power supply terminal of the second load.

In a preferred aspect of the present invention, the first control loop and the second control loop are constituted so as not to interfere with each other.

In a further preferred aspect of the present invention, the control circuit in accordance with Claim 2, wherein a response frequency of the second control loop is ten times or more than that of the first control loop.

In a further preferred aspect of the present invention, the second control loop increases the output voltage in response to a drop in at least one of the first and second voltages.

The above and other objects of the present invention can be also accomplished by a control circuit for a switching power supply device having a main circuit portion and an output terminal that is to be connected to a power supply terminal of a first load by a first wiring and a power supply terminal of a second load by a second wiring, comprising first means for generating a first feedback signal based on an output voltage appearing at the output terminal, second means for generating a second feedback signal based on a voltage appearing at the first wiring in a vicinity of the power supply terminal of the first load and a voltage appearing at the second wiring in a vicinity of the power supply terminal of the second load, third means for generating a third feedback signal based on the first feedback signal and the second feedback signal and fourth means for controlling an operation of the main circuit portion based on the third feedback signal.

In a preferred aspect of the present invention, a response frequency of the first means is lower than that of the third means.

The above and other objects of the present invention can be also accomplished by a switching power supply device for supplying a power voltage to first and second loads, comprising an output terminal that is to be connected to a power supply terminal of the first load by a first wiring and a power supply terminal of the second load by a second wiring, a main circuit portion that generates an output voltage at the output terminal including at least a switching element and a control circuit that controls an operation of the switching element having a first control loop for stabilizing the output voltage and a second control loop for eliminating a difference between a first voltage appearing at the first wiring in a vicinity of the power supply terminal of the first load and a second voltage appearing at the second wiring in a vicinity of the power supply terminal of the second load.

The above and other objects of the present invention can be also accomplished by a switching power supply device for supplying a power voltage to first and second loads, comprising an output terminal that is to be connected to a power supply terminal of the first load by a first wiring and a power supply terminal of the second load by a second wiring, a main circuit portion that generates an output voltage at the output terminal including at least a switching element, and a control circuit that controls an operation of the switching element having first means for generating a first feedback signal based on the output voltage, second means for generating a second feedback signal based on a voltage appearing at the first wiring in a vicinity of the power supply terminal of the first load and a voltage appearing at the second wiring in a vicinity of the power supply terminal of the second load, third means for generating a third feedback signal based on the first feedback signal and the second feedback signal, and fourth means for determining on and off time of the switching element based on the third feedback signal.

The present invention makes it possible to eliminate a voltage difference occurring between the voltage in the vicinity of the power supply terminal of the first load and the voltage in the vicinity of the power supply terminal of the second load. Therefore, in the case where, for example, a load current flowing through one of the first load and the second load increases rapidly to lower the voltage at the power supply terminal of the load, the voltage at the power supply terminal of the other load can be prevented from being lowered. Further, the first loop and the second loop can be constituted so as not to interfere with each other. Specifically, the first control loop and the second control loop can be constituted so that the response frequency of the second control loop is ten times or more than that of the first control loop.

The above and other objects and features of the present invention will become apparent from the following description made with reference to the accompanying drawings.

DESCRIPTION OF THE PREFERRED EMBODIMENT

Figure 1:
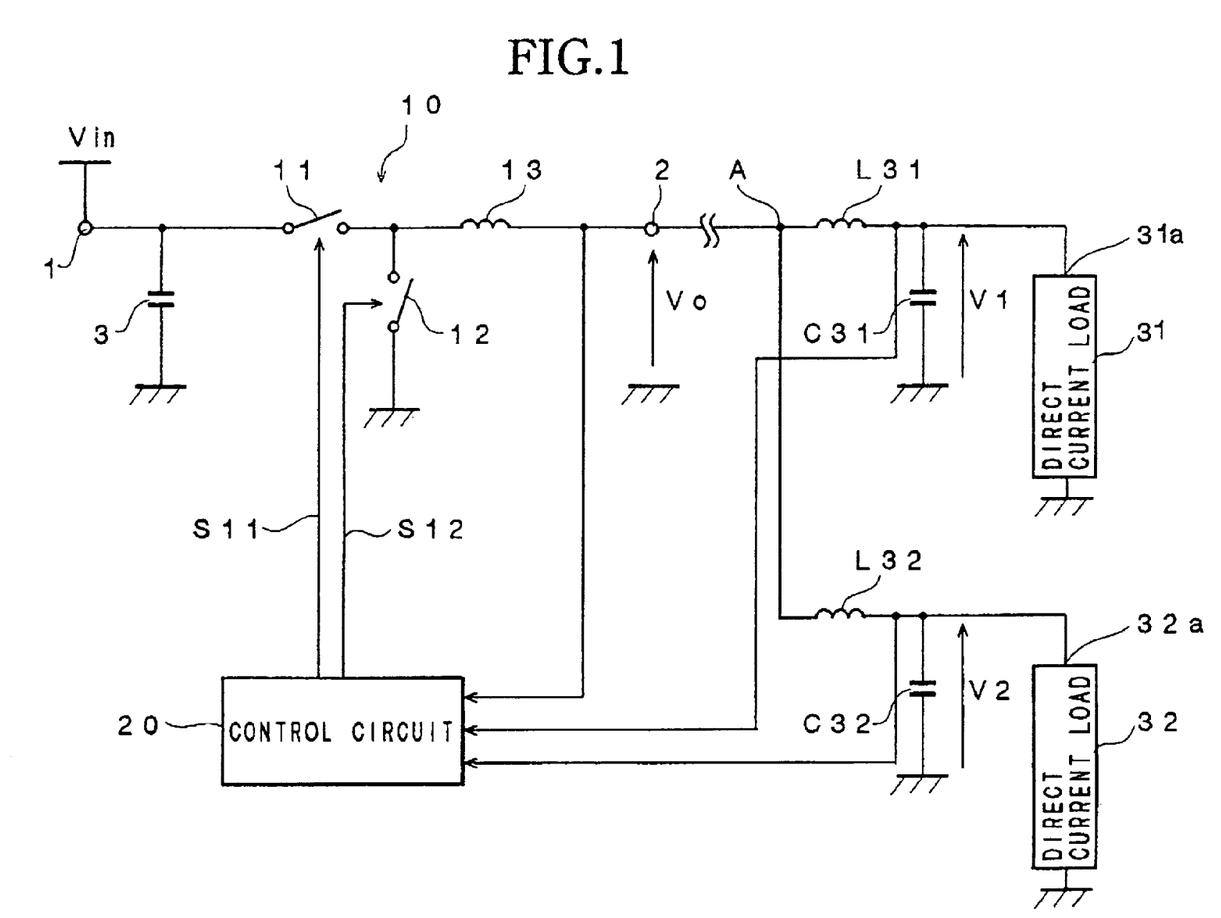
FIG. 1 is a circuit diagram showing a switching power supply device that is a preferred embodiment of the present invention.

FIG. 1 is a circuit diagram showing a switching power supply device that is a preferred embodiment of the present invention.

As shown in FIG. 1, the switching power supply device according to this embodiment is constituted so as to drop an input voltage Vin supplied to an input power supply terminal 1, thereby generating an output voltage Vo and feed the thus generated output voltage Vo to an output power supply terminal 2 and includes an input capacitor 3, a main circuit portion 10 and a control circuit 20.

Two direct current loads 31 and 32 are connected to the output power supply terminal 2. An output capacitor C31 is provided in the vicinity of the power supply terminal 31a of the load 31 and an output capacitor C32 is provided in the vicinity of the power supply terminal 32a of the load 32.

Moreover, as shown in FIG. 1, a parasitic inductance element L31 is present between a branch point A and the output capacitor C31 and a parasitic inductance element L32 is present between the branch point A and the output capacitor C32. The inductance of these parasitic inductance elements L31 and L32 is very small and generally about several tens of nH.

The kinds of the loads 31 and 32 are not particularly limited but this embodiment is more effective in the case where at least one of the loads 31 and 32 is constituted by a direct current load whose load current changes rapidly, such as a CPU, a DSP or the like.

The main circuit portion 10 includes switching elements 11 and 12 and an output reactor 13. The switching element 11 and the output reactor 13 are connected in series between the input capacitor 3 and the output power supply terminal 2. The switching element 12 is connected between the connection point of the switching element 11 and the output reactor 13 and ground.

These switching elements 11 and 12 are alternately turned on with intervention of a predetermined dead time under the control of the control circuit 20.

As shown in FIG. 1, the main circuit portion 10 of the switching power supply device according to this embodiment is provided with no output capacitor and instead of an output capacitor, the output capacitors C31 and C32 are provided so as to be associated with the respective direct current loads 31 and 32. Therefore, even in the case where the distance between the output power supply terminal 2 of switching power supply device and the direct current load 31 or 32 is long, the voltage at the power supply terminals 31a and 32a can be stabilized.

Figure 2:
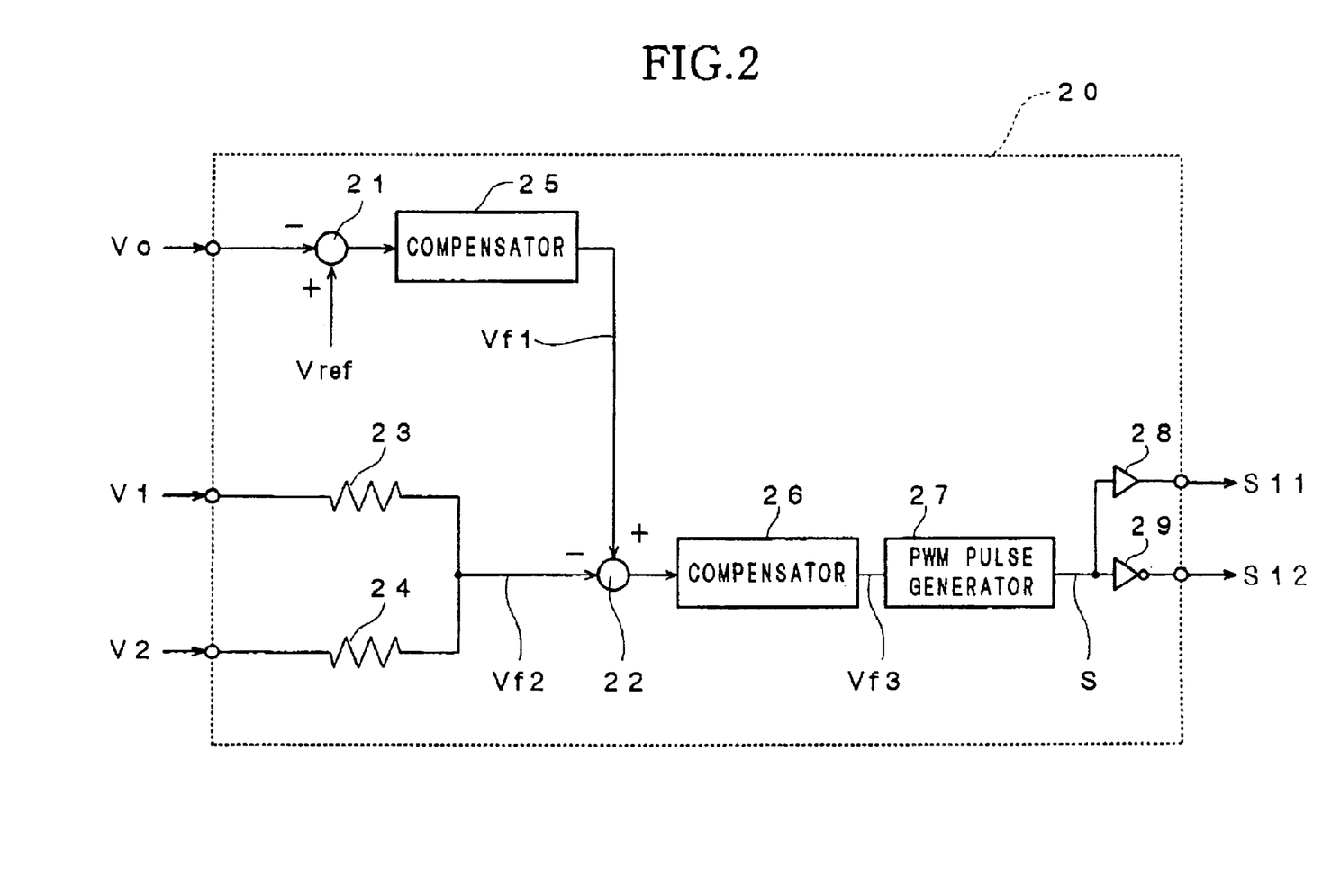
FIG. 2 is a circuit diagram of a control circuit.

FIG. 2 is a circuit diagram of the control circuit 20.

As shown in FIG. 2, the control circuit 20 includes subtractors 21 and 22, resistances 23 and 24, compensators 25 and 26, a PWM pulse generator 27, a buffer 28, and an inverter 29.

The subtractor 21 is a circuit adapted for comparing the output voltage Vo appearing at the output power supply terminal 2 and a reference voltage Vref which is a target value and obtaining the voltage difference between the output voltage Vo and the reference voltage Vref and the thus obtained voltage difference is supplied to the compensator 25.

The compensator 25 is a circuit adapted for improving and stabilizing control performance and has a predetermined response frequency. In this embodiment, the response frequency of the compensator 25 is defined as f1. A feedback voltage Vf1, which is the output of the compensator 25, is supplied to the subtractor 22.

The resistance values of the resistances 23 and 24 are equal to each other. The voltage V1 of the output capacitor C31 is supplied to one terminal of the resistance 23 and the voltage V2 of the output capacitor C32 is supplied to one terminal of the resistance 24. The other terminals of the resistances 23 and 24 are connected to each other. As a result, a feedback voltage Vf2, which is the voltage at the connection point (other terminals) of the resistance 23 and the resistance 24, coincides with the mean value of the voltage V1 of the output capacitor C31 and the voltage V2 of the output capacitor C32. The feedback voltage Vf2 is supplied to the subtractor 22.

The subtractor 22 is a circuit adapted to subtract the feedback voltage Vf2 from the feedback voltage Vf1, thereby producing a difference voltage and the thus produced difference voltage is supplied to the compensator 26. The compensator 26 is a circuit adapted for improving and stabilizing control performance and has a predetermined response frequency. In this embodiment, the response frequency of the compensator 26 is defined as f2. It is necessary to set the response frequency f2 of the compensator 26 considerably higher than the response frequency f1 of the compensator 25, and the response frequency f2 of the compensator 26 is preferably set to be ten times or more than the response frequency f1 of the compensator 25. A feedback voltage Vf3, which is the output of the compensator 26, is supplied to the PWM pulse generator 27.

The PWM pulse generator 27 is a circuit adapted to accept the output of the compensator 26 and generate PWM pulses S based thereon. The thus generated pulses S are supplied to the inverter 29. Drive signals S11 and S12, which are outputs of the buffer 28 and the inverter 29, are supplied to the switching elements 11 and 12.

These switching elements 11 and 12 are turned on when the corresponding drive signals S11 and S12 are at high level (H) and are turned off when the corresponding drive signals S11 and S12 are at low level (L). Therefore, the switching elements 11 and 12 are alternately turned on.

Among the components constituting the control circuit 20, the components other than the buffer 28 and the inverter 29 are preferably integrated on a semiconductor chip, since they do not require high drive capability. However, the invention is not limited to this arrangement.

Figure 3:
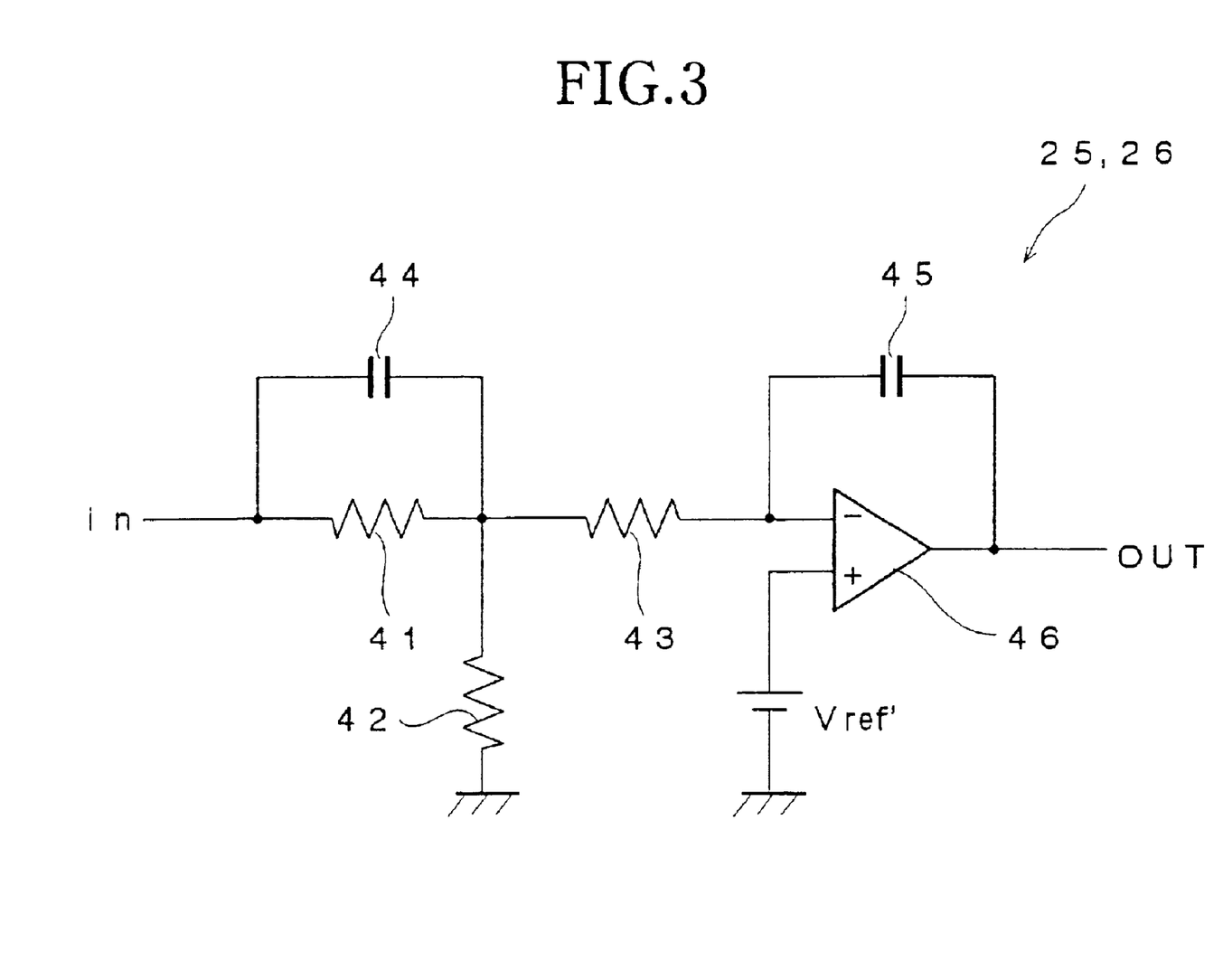
FIG. 3 is a circuit diagram showing an example of a compensator.

FIG. 3 is a circuit diagram showing an example of the compensators 25 and 26.

In the example shown in FIG. 3, the circuit diagram of the compensators 25 or 26 is a filter circuit comprising resistors 41 to 43, capacitors 44 and 45 and an operational amplifier 46 and having a predetermined gain. If thus-constituted compensators 25 and 26 are used, the setting of the response frequencies f1 and f2 thereof can be adjusted mainly by appropriately selecting the constant of the capacitor 45 or the characteristics of the operational amplifier 46. As described above, the relationship between the response frequency f1 of the compensator 25 and the response frequency f2 of the compensator 26 is set to be f1<<f2 and is preferably set to be 10×f1<f2.

Next, the operation of the switching power supply device according to this embodiment will be explained.

The feedback voltage Vf1 is the output of the compensator 25 is when the difference voltage produced by subtracting the output voltage Vo appearing at the output power supply terminal 2 from the reference voltage Vref is applied to the compensator 25. Therefore, as the output voltage Vo appearing at the output power supply terminal 2 rises relative to the reference voltage Vref, the level of the feedback voltage Vf1 becomes lower. On the other hand, as the output voltage Vo appearing at the output power supply terminal 2 becomes lower relative to the reference voltage Vref, the level of the feedback voltage Vf1 rises.

Further, since the feedback voltage Vf2 is equal to the mean value of the voltage V1 of the output capacitor C31 and the voltage V2 of the output capacitor C32, as at least one of the voltage V1 or the voltage V2 is lowered, the level of the feedback voltage Vf2 becomes lower. Specifically, when the voltage V1 of the output capacitor C31 and the voltage V2 of the output capacitor C32 are stable at the desired voltage, the feedback voltage Vf2 is also maintained at the desired voltage and when one of the voltage V1 of the output capacitor C31 and the voltage V2 of the output capacitor C32 drops, the level of the feedback voltage Vf2 becomes lower by a voltage equal to half of the decrease in one of the voltage V1 and the voltage V2.

The feedback voltage Vf2 is subtracted from the feedback voltage Vf1 by the subtractor 22, and, therefore, as the output voltage Vo rises relative to the reference voltage Vref, the level of the feedback voltage Vf3, which is the output of the compensator 26, becomes lower. On the other hand, as the output voltage Vo falls relative to the reference voltage Vref, the level of the feedback voltage Vf3 rises. Further, when at least one of the voltage V1 and the voltage V2 drops, the level of the feedback voltage Vf3 rises.

Figure 4:
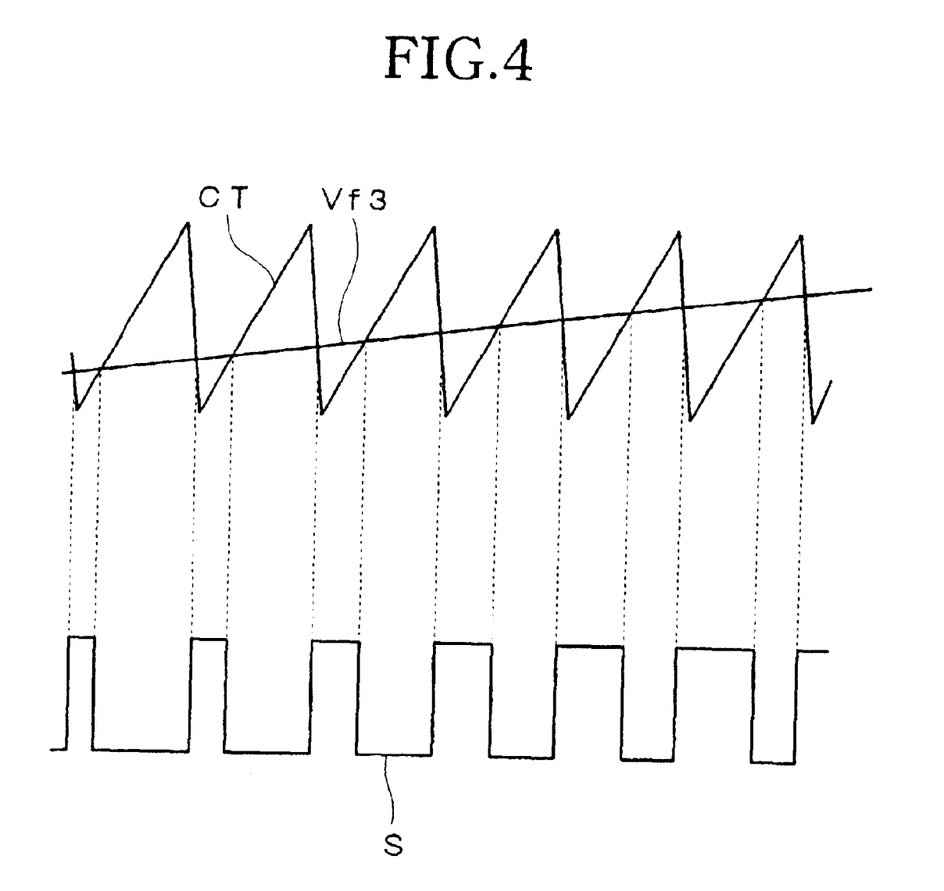
FIG. 4 is a time chart showing generation of PWM pulses S by a PWM generator.

FIG. 4 is a time chart showing generation of PWM pulses S by the PWM generator 27.

As shown in FIG. 4, in the PWM pulse generator 27, a saw wave CT generated therein is compared with the level of the feedback voltage Vf3 supplied from the compensator 26. As a result, when the level of the feedback voltage Vf3 is higher than the level of the saw wave CT, the level of the PWM pulse S is defined as being high level. On the other hand, when the level of the saw wave CT is higher than the level of the feedback voltage Vf3, the level of the PWM pulse S is defined as being low level.

The waveform of the saw wave CT is kept constant. Therefore, as the level of the feedback voltage Vf3 rises, the duty of the PWM pulse S becomes larger and, on the other hand, as the level of the feedback voltage Vf3 falls, the duty of the PWM pulse S becomes smaller.

Therefore, in the case where the voltage V1 of the output capacitor C31 and the voltage V2 of the output capacitor C32 are stable at the desired voltage, the duty of the PWM pulse S becomes smaller, as the level of the output voltage Vo rises and, on the other hand, the duty of the PWM pulse S becomes larger, as the level of the output voltage Vo falls.

As a result, since the drive signals S11 and S12 are generated based on the PWM pulse S and supplied to the switching elements 11 and 12, the output voltage Vo is controlled so as to coincide with the reference voltage Vref.

Herein, a control loop for stabilizing the output voltage Vo based thereon is referred to as "a first control loop."

As shown in FIG. 2, since the first control loop includes the compensator 25 whose response frequency is relatively low, the response speed of the first control loop is determined mainly by the response frequency of the compensator 25 and is relatively low.

On the other hand, while such a control operation is being performed, when at least one of the voltage V1 of the output capacitor C31 and the voltage V2 of the output capacitor C32 abruptly drops, whereby the level of the feedback voltage Vf2 drops, the level of the feedback voltage Vf3 is increased in accordance with the amount of the decrease in at least one of the voltage V1 and the voltage V2. As a result, if the level of the feedback voltage Vf2 drops rapidly, the duty of the PWM pulse S becomes large rapidly, whereby the output voltage Vo is quickly increased and the voltage V1 of the output capacitor C31 and/or the voltage V2 of the output capacitor C32 which remains low level is quickly recovered.

This means that the value of the time t as shown in the formula (1) becomes sharply shorter and, therefore, the current I flowing from the output capacitor C1(C2) to the output capacitor C2(C1) is markedly reduced in comparison with the conventional switching power supply device. As a result, for example, even if the load current of the direct load 31 increases rapidly, the voltage V2 at the power supply terminal 32a of the other direct load 32 can be effectively prevented from being lowered.

Defining the control loop based on the voltage V1 and the voltage V2 as "a second control loop," the response speed of the second control loop is determined mainly by the response frequency f2 of the compensator 26 because the second control loop does not include the compensator 25 whose response frequency is low. As a result, the response speed of the second control loop is higher than that of the first control loop. Therefore, in this embodiment, since there is no interference between the first control loop and the second control loop, it is possible to simultaneously stabilize the output voltage Vo based thereon and eliminate the difference voltage ΔV based on the voltages V1 and V2 and it is possible to prevent one of the control operations from affecting the other control operation.

In the switching power supply device according to this embodiment, even if a difference voltage ΔV is generated between the voltage V1 of the output capacitor C31 and the voltage V2 of the output capacitor C32, since the difference voltage ΔV can be quickly eliminated in this manner, it is possible to effectively lower the current ΔI flowing between the output capacitor C31 and the output capacitor C32. Moreover, in this embodiment, since the first control loop and the second control loop are constituted so as not to interfere with each other, the operation for stabilizing the output voltage Vo is not impaired by the operation for eliminating the difference voltage ΔV.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, explanation was made as to the case where two direct current loads 31 and 32 are driven by a single switching power supply device. However, in the present invention, the number of direct current loads to be simultaneously driven is not limited to two and the present invention can be effectively applied to the case where three or more direct current loads are simultaneously driven. In such a case, the average value of the voltages of the respective power supply terminals of three or more direct current loads or a value that varies in proportion to the average value may be used as a feedback voltage Vf2.

Further, in the switching power supply device according to the above described embodiment, the output voltage Vo is directly subtracted from the reference voltage Vref using the subtractor 21. However, the feedback voltage Vf1 may be generated by dividing the output voltage Vo using a voltage dividing circuit including resistances and subtracting the thus obtained voltage from the reference voltage Vref.

Similarly, in the switching power supply device according to the above described embodiment, the mean value of the voltage V1 of the output capacitor C31 and the voltage V2 of the output capacitor C32 is used as the feedback voltage Vf2. However, it is possible to divide the mean value using a voltage dividing circuit including resistances and use the thus obtained voltage as the feedback voltage Vf2.

Further, the main circuit portion 10 in the above described embodiment is only one example of a main circuit portion of a switching power supply device to which the present invention can be applied and, therefore, the present invention can be is applied to a switching power supply device including a main circuit portion having a different circuit configuration.

As described above, according to the present invention, in the case where a voltage difference occurs between power supply terminals of a plurality of loads to which a common output voltage is applied, it is possible to quickly eliminate the voltage difference.

What is claimed is:

1. A control circuit for a switching power supply device having an output terminal that is to be connected to a power supply terminal of a first load by a first wiring and a power supply terminal of a second load by a second wiring, comprising:

a first control loop for stabilizing an output voltage appearing at the output terminal; and a second control loop for eliminating a difference between a first voltage appearing at the first wiring in a vicinity of the power supply terminal of the first load and a second voltage appearing at the second wiring in a vicinity of the power supply terminal of the second load.

2. The control circuit in accordance with claim 1, wherein the first control loop and the second control loop are constituted so as not to interfere with each other.

3. The control circuit in accordance with claim 2, wherein a response frequency of the second control loop is ten times or more than that of the first control loop.

4. The control circuit in accordance with claim 1, wherein the second control loop increases the output voltage in response to a drop in at least one of the first and second voltages.

5. The control circuit in accordance with claim 2, wherein the second control loop increases the output voltage in response to a drop in at least one of the first and second voltages.

6. The control circuit in accordance with claim 3, wherein the second control loop increases the output voltage in response to a drop in at least one of the first and second voltages.

7. A control circuit for a switching power supply device having a main circuit portion and an output terminal that is to be connected to a power supply terminal of a first load by a first wiring and a power supply terminal of a second load by a second wiring, comprising:
　first means for generating a first feedback signal based on an output voltage appearing at the output terminal;
　second means for generating a second feedback signal based on a voltage appearing at the first wiring in a vicinity of the power supply terminal of the first load and a voltage appearing at the second wiring in a vicinity of the power supply terminal of the second load;
　third means for generating a third feedback signal based on the first feedback signal and the second feedback signal; and
　fourth means for controlling an operation of the main circuit portion based on the third feedback signal.

8. The control circuit in accordance with claim 7, wherein a response frequency of the first means is lower than that of the third means.

9. A switching power supply device for supplying a power voltage to first and second loads, comprising:
　an output terminal that is to be connected to a power supply terminal of the first load by a first wiring and a power supply terminal of the second load by a second wiring;
　a main circuit portion that generates an output voltage at the output terminal including at least a switching element; and
　a control circuit that controls an operation of the switching element having a first control loop for stabilizing the output voltage and a second control loop for eliminating a difference between a first voltage appearing at the first wiring in a vicinity of the power supply terminal of the first load and a second voltage appearing at the second wiring in a vicinity of the power supply terminal of the second load.

10. The switching power supply device in accordance with claim 9, wherein the first control loop and the second control loop are constituted so as not to interfere with each other.

11. The switching power supply device in accordance with claim 10, wherein a response frequency of the second control loop is ten times or more than that of the first control loop.

12. The switching power supply device in accordance with claim 9, wherein the second control loop increases the output voltage in response to a drop in at least one of the first and second voltages.

13. The switching power supply device in accordance with claim 10, wherein the second control loop increases the output voltage in response to a drop in at least one of the first and second voltages.

14. The switching power supply device in accordance with claim 11, wherein the second control loop increases the output voltage in response to a drop in at least one of the first and second voltages.

15. A switching power supply device for supplying a power voltage to first and second loads, comprising:
　an output terminal that is to be connected to a power supply terminal of the first load by a first wiring and a power supply terminal of the second load by a second wiring;
　a main circuit portion that generates an output voltage at the output terminal including at least a switching element; and
　a control circuit that controls an operation of the switching element having first means for generating a first feedback signal based on the output voltage, second means for generating a second feedback signal based on a voltage appearing at the first wiring in a vicinity of the power supply terminal of the first load and a voltage appearing at the second wiring in a vicinity of the power supply terminal of the second load, third means for generating a third feedback signal based on the first feedback signal and the second feedback signal, and fourth means for determining on and off time of the switching element based on the third feedback signal.

16. The switching power supply device in accordance with claim 15, wherein a response frequency of the first means is lower than that of the third means.

* * * * *